US009713054B2

(12) United States Patent
Ciullo et al.

(10) Patent No.: US 9,713,054 B2
(45) Date of Patent: Jul. 18, 2017

(54) COMMUNICATION TERMINAL AND METHOD FOR COMMUNICATING DATA

(71) Applicant: Intel Corporation, Santa Clara, CA (US)

(72) Inventors: Delia Ciullo, Juan les Pins (FR); Thrasyvoulos Spyropoulos, Nice (FR); Bruno Jechoux, Antibes (FR)

(73) Assignee: INTEL CORPORATION, Santa Clara, CA (US)

( * ) Notice: Subject to any disclaimer, the term of this patent is extended or adjusted under 35 U.S.C. 154(b) by 7 days.

(21) Appl. No.: 14/779,988

(22) PCT Filed: Nov. 13, 2014

(86) PCT No.: PCT/IB2014/002957
§ 371 (c)(1),
(2) Date: Sep. 25, 2015

(87) PCT Pub. No.: WO2016/075506
PCT Pub. Date: May 19, 2016

(65) Prior Publication Data
US 2016/0192258 A1    Jun. 30, 2016

(51) Int. Cl.
*H04W 36/14* (2009.01)
*H04W 52/02* (2009.01)
*H04L 12/26* (2006.01)

(52) U.S. Cl.
CPC ......... *H04W 36/14* (2013.01); *H04L 43/0852* (2013.01); *H04W 52/028* (2013.01); *H04W 52/0258* (2013.01); *Y02B 60/50* (2013.01)

(58) Field of Classification Search
CPC  H04W 36/14; H04W 52/0258; H04W 52/028
(Continued)

(56) References Cited

U.S. PATENT DOCUMENTS

| 2003/0100308 | A1* | 5/2003 | Rusch | H04W 48/18 455/445 |
| 2005/0152280 | A1* | 7/2005 | Pollin | H04L 41/00 370/252 |
| 2007/0076606 | A1* | 4/2007 | Olesinski | H04L 41/0893 370/230 |
| 2009/0088188 | A1* | 4/2009 | Wormald | H04W 4/18 455/466 |
| 2009/0225682 | A1* | 9/2009 | Grote-Lopez | H04L 41/083 370/255 |

(Continued)

FOREIGN PATENT DOCUMENTS

EP   1361708 A2   11/2003
WO   2009/100764 A1   8/2009

OTHER PUBLICATIONS

International Search Report issued in the corresponding PCT application No. PCT/IB2014/002957 mailed on Jul. 17, 2015 (11 pages).

(Continued)

*Primary Examiner* — Ronald B Abelson
(74) *Attorney, Agent, or Firm* — Viering, Jentschura & Partner mbB

(57) ABSTRACT

A communication terminal is described having a first transceiver configured to provide a first communication channel via a first radio access network, a second transceiver configured to provide a second communication channel via a second radio access network, a size threshold determiner configured to determine a size threshold based on a limit for an average delay of data communications, a size determiner configured to determine a size of data to be communicated, a selector configured to select the first transceiver and the first communication channel or the second transceiver and the second communication channel for communicating the data based on a comparison of the size of the data with the size threshold and a controller configured to control the selected transceiver to communicate the data via the selected communication channel.

16 Claims, 6 Drawing Sheets

(58) Field of Classification Search
USPC ..................................................... 370/331
See application file for complete search history.

(56) References Cited

U.S. PATENT DOCUMENTS

| | | |
|---|---|---|
| 2010/0208607 A1 | 8/2010 | Chin et al. |
| 2013/0260757 A1 | 10/2013 | Deivasigamani et al. |
| 2014/0094204 A1* | 4/2014 | Dimou ............... H04W 52/242 455/501 |
| 2014/0286316 A1 | 9/2014 | Park et al. |
| 2014/0328318 A1 | 11/2014 | Sundararajan et al. |

OTHER PUBLICATIONS

Lee et al., "Mobile Data Offloading: How Much Can WiFi Deliver?", IEEE/ACM Transactions on Networking, 2013, vol. 21, Issue 2 (12 pages).

Balasubramanian et al., "Augmenting Mobile 3G Using WiFi", University of Massachusetts Microsoft Research, MobiSys'10 (29 pp.).

Mehmeti et al., "Is it Worth to be Patient? Analysis and Optimization of Delayed Mobile Data Offloading", IEEE Infocom 2014 (9 pages).

Yap et al., "Making Use of All the Networks Around Us: A Case Study in Android", CellNet'12, 2012, pp. 19-24 (6 pages).

Xiao et al., "Modeling Energy Consumption of Data Transmission over Wi-Fi", IEEE Transactions on Mobile Computing, 2013, vol. 13, Issue 8, pp. 1760-1773 (14 pages).

Ding et al., "Characterizing and Modeling the Impact of Wireless Signal Strength on Smartphone Battery Drain", SIGMETRICS '13, 2013, vol. 41, Issue 1, pp. 29-40 (12 pages).

Sharma et al., "Cool-Tether: Energy efficient on-the-fly wifi hotspots using mobile phones", ACM CoNEXT 2009, pp. 109-120 (12 pages).

"A 3G/LTE Wi-Fi Offload Framework: Connectivity Engine (CnE) to Manage Inter-System Radio Connections and Applications", Qualcomm, 2011 (http://www.qualcomm.com/media/documents/3g-lte-wifi-offload-framework) (15 pages).

* cited by examiner

COMMUNICATION TERMINAL AND METHOD FOR COMMUNICATING DATA

RELATED APPLICATIONS

The present application is a national stage entry according to 35 U.S.C. §371 of PCT application No.: PCT/IB2014/002957 filed on Nov. 13, 2014, and is incorporated herein by reference in its entirety.

TECHNICAL FIELD

Embodiments described herein generally relate to communication terminals and methods for communicating data.

BACKGROUND

In a mobile communication terminal such as a mobile phone or a tablet computer it is typically desirable to have a high data transmission speed, for example to decrease waiting times but also to save power. Data transmission speed can for example be increased by offloading data traffic from a slower network to a faster network i.e. to transmit data using a radio access network providing a higher data rate instead of a radio access network providing a lower data rate. However, this may on the other hand introduce delays, for example because a radio network (such as a WiFi network) may only be available at certain times such that there is typically a tradeoff between communication speed and delay. Accordingly, efficient offloading policies are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
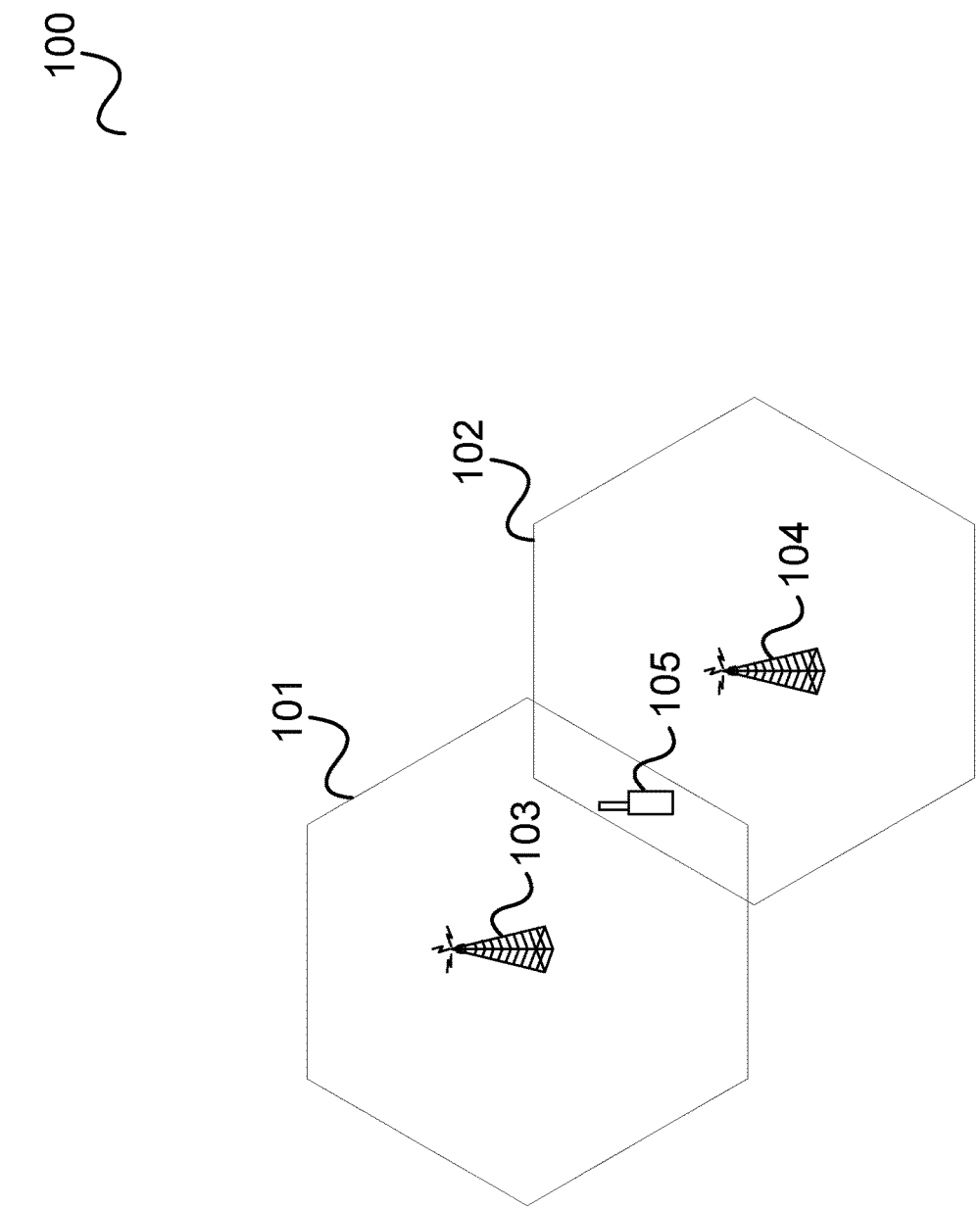
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. In the present example, the base station 103 is part of a first radio access network and the second base station 104 is part of a second radio access network. The radio access networks are for example different mobile communication networks. For example, the radio access networks may be different cellular communication networks e.g. according to GSM (Global System for Mobile Communications), UMTS (Universal Mobile Telecommunications System), CDMA2000 (CDMA: Code Division Multiple Access) communication system, FOMA (Freedom of Mobile Access) communication system or also LTE (Long Term Evolution) or the first radio access network is a cellular communication network (e.g. according to one of the above communication technologies) while the second radio access network is a wireless local area network (WLAN), e.g. a WiFi network. Accordingly, the second base station 104 is for example an access point. A cellular communication network may be understood as a wide area network in contrast to a wireless local area network.

The first radio cell 101 and the second radio cell 102 overlap in the sense that a mobile terminal 105 located at the edge of the first radio cell 101 in an overlap area of the first radio cell 101 and the second radio cell 102 can receive signals from both the first base station 103 and the second base station 104, wherein it is assumed that the mobile terminal 105 supports an interface to the first radio access network and an interface to the second radio access network (e.g. has corresponding transceivers). Accordingly, both base stations 103, 104 may serve the mobile terminal 105. This means that the mobile terminal may use the first radio access network for accessing (i.e. communicating with) a communication network such as the Internet and may also use the second radio access network for accessing the communication network.

The explosive growth of mobile data traffic is raising concerns both for mobile operators, due to capacity and cost reasons, and for users, whose data hungry apps are slowing down and battery consumption is speeding up in case of high traffic. To cope with this, data traffic may be offloaded between networks. For example, in a scenario like illustrated in FIG. 1, e.g. in case that the first radio access network is a cellular communication network and the second radio access network is a wireless local area network (WLAN), e.g. a WiFi network, traffic may be offloaded from the cellular communication network to the WiFi network (i.e. data may be communicated via the WiFi network instead of the cellular communication network) when the WiFi network is available (i.e. when the mobile terminal, as illustrated in FIG. 1, is in the coverage area of both networks). This allows alleviating the load of the cellular communication networks, and can often provide a user (e.g. the user of the mobile terminal 105) with a higher data rate.

Examples for offloading policies are on-the-spot offloading and delayed offloading. On-the-spot offloading simply switches all traffic from the cellular network to the WiFi network when the latter is available. The benefits of such an offloading in terms of performance and mobile terminal power savings typically depend on WiFi availability, the type of environment of the mobile terminal (e.g., rural, urban), user mobility, etc. However, studies have shown that this type of offloading already can save up to 55% of battery power.

In delayed offloading some data transfers are delayed until a WiFi network is available. All data is communicated by default by WiFi (i.e. is offloaded to WiFi), but each data flow is associated with a deadline: if the transfer of the data flow does not finish within its deadline, the data flow is sent over the cellular interface, i.e. using a cellular communication network. Additional benefits from this type of offloading can be significant, but they are typically sensitive to the imposed deadline. For example, for delayed offloading transfer with short deadlines (like 100 seconds) the achievable energy gains compared to on-the-spot offloading may only be about 3%. However, even with a simple policy and 1 hour deadlines, the gain can already be increased to around 20%.

The above policies can be considered to be simple in that they assign all flows initially to one interface (WiFi or cellular). This may also be partly due to the fact that current mobile devices typically do not enable both interfaces in parallel. Simple parallel usage might already provide higher aggregate rates.

Nevertheless, better performance can be achieved by intelligently choosing which flow is assigned on which interface, e.g., based on application type, size, etc. As an example, larger flows can be sent to the faster interface (i.e. be communicated by the network offering the faster connection), in order to balance the interface loads. This can be seen to be reminiscent of the task assignment problem in queuing theory, where the WiFi and cellular interfaces can be seen as two heterogeneous servers (i.e., with different service rate). While the typical task assignment problem is to minimize job delay, things are more complicated in the case of data offloading: First, energy consumption is an equally (if not more) important concern for users. Second, WiFi communication is typically only intermittently available. Finally, the ability to delay some flows adds another dimension to the flow assignment decision.

In the following, examples are described which can be seen to consider these aspects together. Specifically, a smart offloading policy is described that attempts to achieve a good energy-delay tradeoff.

Figure 2:
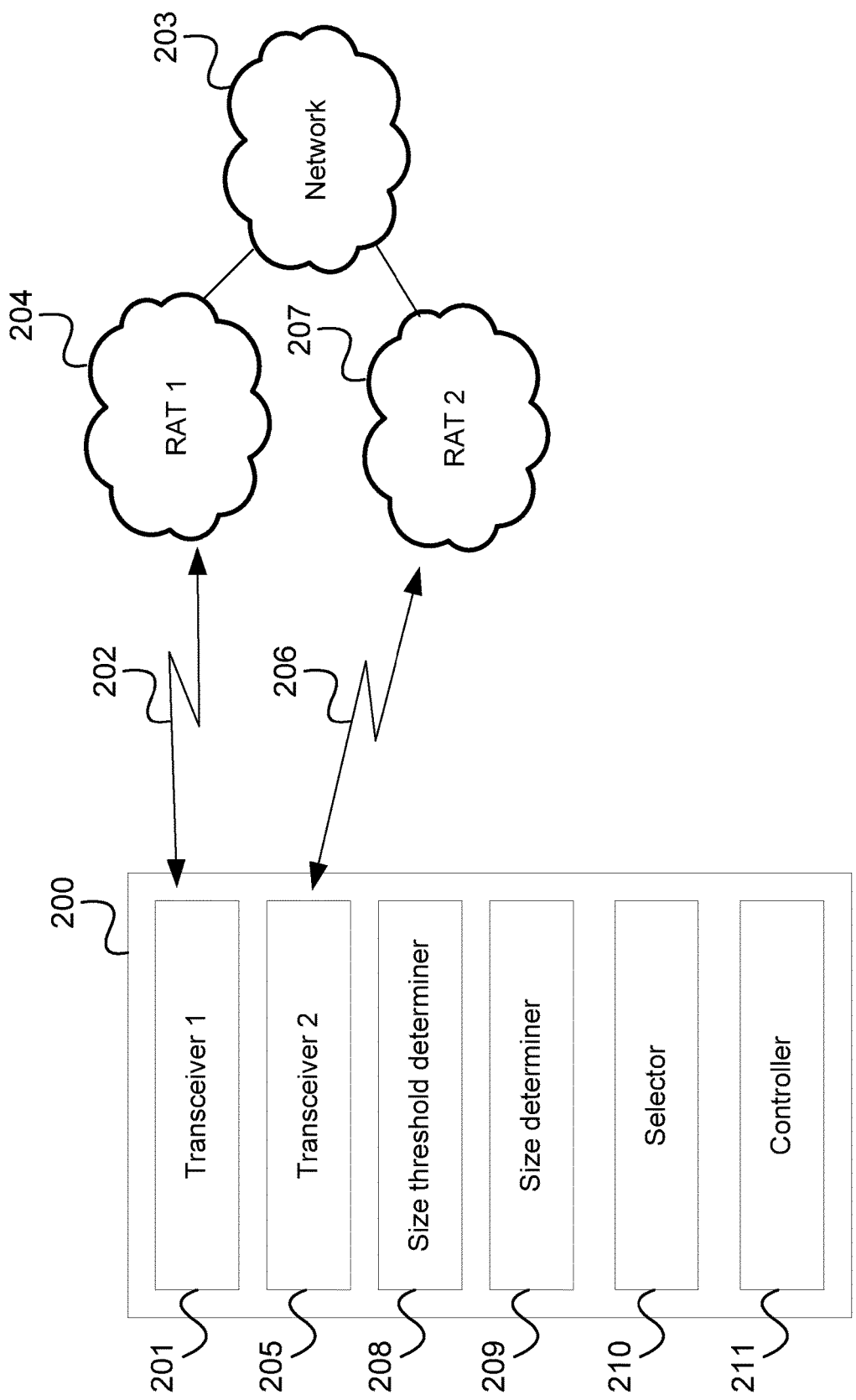
FIG. 2 shows a communication terminal.

FIG. 2 shows a communication terminal 200.

The communication terminal includes a first transceiver 201 configured to provide a first communication channel 202 between the communication terminal 200 and a communication network 203 via a first radio access network 204 and a second transceiver 205 configured to provide a second communication channel 206 between the communication terminal 200 and the communication network 203 via a second radio access network 207.

The communication terminal 200 further includes a size threshold determiner 208 configured to determine a size threshold based on a limit for an average delay of data communications and a size determiner 209 configured to determine a size of data to be communicated between the communication terminal 200 and the communication network.

Further, the communication terminal 200 includes a selector 210 configured to select the first transceiver 201 and the first communication channel 202 or the second transceiver 205 and the second communication channel 206 for communicating the data based on a comparison of the size of the data with the size threshold and a controller 211 configured to control the selected transceiver 201, 205 to communicate the data via the selected communication channel 202, 206, i.e. to have the selected transceiver 201, 205 to communicate the data via the selected communication channel 202, 206.

In other words, for example a communication terminal uses an offloading policy (referred to as threshold policy in the following) which chooses which data (generated or requested by the mobile terminal) are assigned to which radio access network (i.e. are communicated over which radio access network, e.g. WiFi or cellular) towards minimizing the energy consumption at the mobile terminal while keeping the average delay bounded. It can thus be seen as a size-based policy that for example considers the rate of each interface (i.e. the transmission rate of the communication channels) together with, availability patterns, (e.g. WiFi availability patterns), as well as load-balancing and queuing aspects. Simulations show that the threshold policy allows achieving considerable energy savings given a certain average per-flow delay constraint.

The limit for the average delay may for example be set by a user of the communication terminal or by the operator of a home network of the communication terminal.

The data may correspond to a data flow, i.e. may be the data transmitted in a data flow. A data flow (or just flow) may be understood as a concatenation of packets corresponding to the same application request (e.g. a file to be downloaded, a webpage to be downloaded or a photo uploaded to a social network) and has a duration and inter-packet arrival time. For a flow corresponding to an uplink data transmission, the size of the flow can be determined by the mobile terminal. For a flow corresponding to a downlink data transmission the application to whose request the flow corresponds may know or estimate the file size (e.g. the size of a requested video file) or may request the server providing the data to be downloaded to provide the size of the data. Data corresponding to an application request (e.g. a web site retrieval request or a file transmission request) may be seen as the data being communicated as a result of the request or for fulfilling the request.

As in the example of WiFi network and a cellular communication network, the first radio access network may for example have a higher expected period of unavailability than the second radio access network. This means that it may take some time until the first radio access network becomes available (e.g. the first radio access network is the next WiFi network that becomes available) and this time is expected to be longer than the time until the second radio access network is available (which may for example be available almost at all times such as a cellular mobile communication network).

The components of the communication terminal (e.g. the transceiver, the size threshold determiner, the determiner, the selector and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 3:
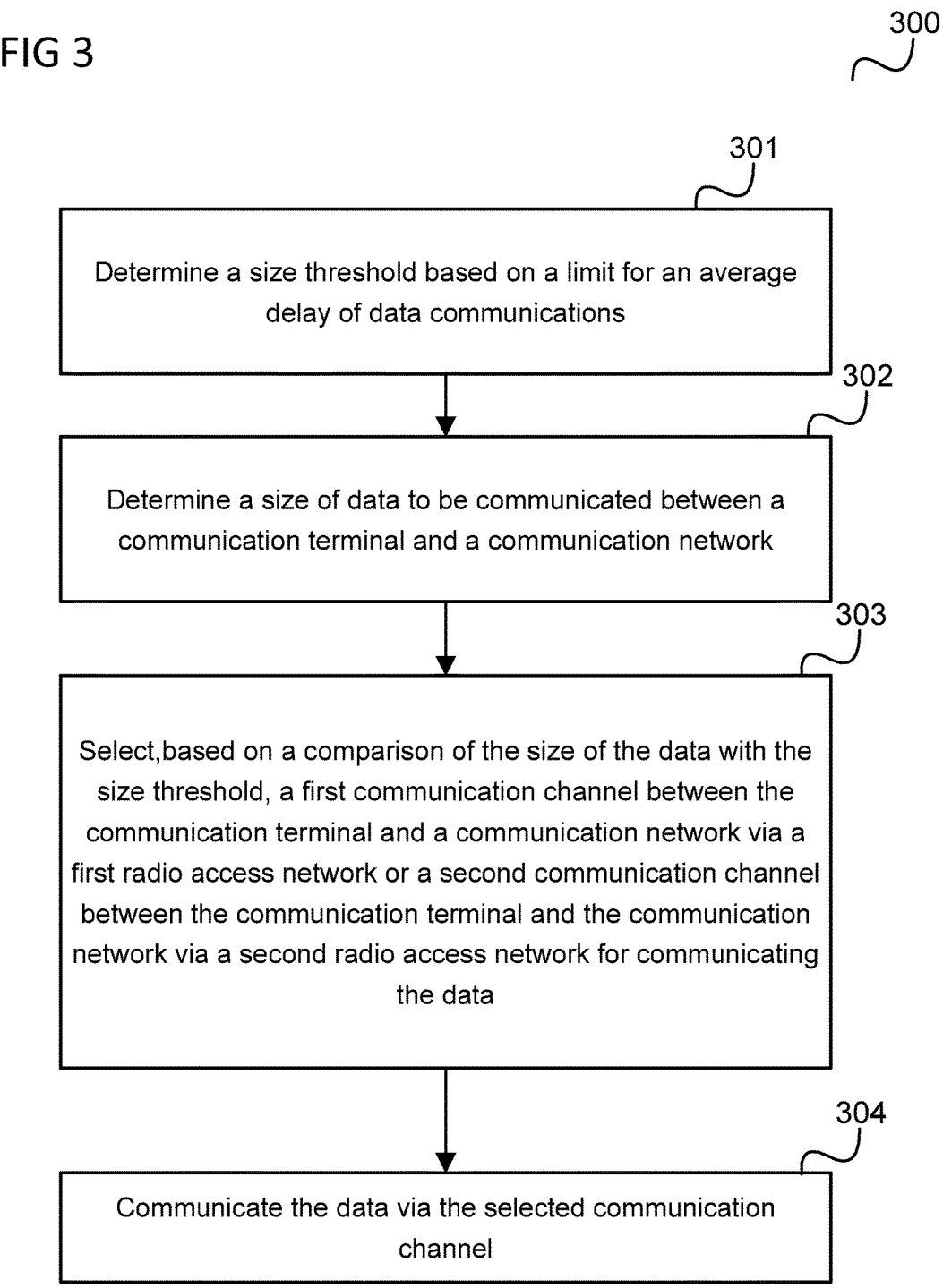
FIG. 3 shows a diagram illustrating a method for communicating data.

The communication terminal for example carries out a method as illustrated in FIG. 3.

FIG. 3 shows a diagram illustrating a method for communicating data, for example carried out by a communication terminal.

In 301, the communication terminal determines a size threshold based on a limit for an average delay of data communications.

In 302, the communication terminal determines a size of data to be communicated between the communication terminal and a communication network.

In 303, the communication terminal selects, for communicating the data, a first communication channel between the communication terminal and a communication network via a first radio access network or a second communication channel between the communication terminal and the communication network via a second radio access network based on a comparison of the size of the data with the size threshold.

In 304, the communication terminal communicates the data via the selected communication channel.

The following examples pertain to further embodiments.

Example 1 is a communication terminal as illustrated in FIG. 2.

In Example 2, the subject matter of Example 1 may optionally include the size threshold determiner being configured to determine the size threshold based on statistical information about the data.

In Example 3, the subject matter of Example 2 may optionally include the statistical information including an expected size of the data and a variance of the size of the data.

In Example 4, the subject matter of any one of Examples 1-3 may optionally include the selector being configured to select the first communication network if the size is above the size threshold.

In Example 5, the subject matter of any one of Examples 1-4 may optionally include the size threshold determiner being configured to determine the size threshold based on an expected delay of transmission of data via the first radio access network and an expected delay of transmission of data via the second radio access network.

In Example 6, the subject matter of Example 5 may optionally include the expected delay of transmission of data via the first radio access network and the expected delay of transmission of data via the second radio access network depending on the size threshold.

In Example 7, the subject matter of any one of Examples 1-6 may optionally include the size threshold determiner being configured to determine the size threshold based on an expected period of unavailability of the first radio access network.

In Example 8, the subject matter of any one of Examples 1-7 may optionally include the first radio access network being a wireless local area network and the second radio access network being a cellular mobile communication network.

In Example 9, the subject matter of any one of Examples 1-8 may optionally include the size threshold determiner being configured, if the first communication network has a higher rate than the second communication network, to determine the size threshold as low as possible to stay within the limit of the average delay.

In Example 10, the subject matter of any one of Examples 1-9 may optionally include the size threshold determiner being configured, if the second communication network has a higher rate than the first communication network, to determine the size threshold as high as possible to stay within the limit of the average delay.

In Example 11, the subject matter of any one of Examples 1-10 may optionally include the communication terminal being a subscriber terminal of at least one of the first radio access network or a second radio access network.

In Example 12, the subject matter of any one of Examples 1-11 may optionally include the size determiner being configured to determine the size of the data to be communicated by estimating the size of the data based on historical statistical information about data sizes.

In Example 13, the subject matter of any one of Examples 1-12 may optionally include the size determiner being configured to determine the size of the data based on information about the size of the data provided by a source of the data.

In Example 14, the subject matter of any one of Examples 1-13 may optionally include the data to be communicated being data to be transmitted from the communication terminal to a component of the communication network or being data to be received by the communication terminal from a component of the communication network.

In Example 15, the subject matter of any one of Examples 1-14 may optionally include the data to be communicated being the data of a data flow.

In Example 16, the subject matter of any one of Examples 1-15 may optionally include the size threshold determiner being configured to determine the size threshold based on a minimization of the power consumption of the communication of the data.

Example 17 is a method for communicating data as illustrated in FIG. 3.

In Example 18, the subject matter of Example 17 may optionally include determining the size threshold based on statistical information about the data.

In Example 19, the subject matter of Example 18 may optionally include the statistical information including an expected size of the data and a variance of the size of the data.

In Example 20, the subject matter of any one of Examples 17-19 may optionally include selecting the first communication network if the size is above the size threshold.

In Example 21, the subject matter of any one of Examples 17-20 may optionally include determining the size threshold based on an expected delay of transmission of data via the first radio access network and an expected delay of transmission of data via the second radio access network.

In Example 22, the subject matter of Example 21 may optionally include the expected delay of transmission of data via the first radio access network and the expected delay of transmission of data via the second radio access network depending on the size threshold.

In Example 23, the subject matter of any one of Examples 17-22 may optionally include determining the size threshold based on an expected period of unavailability of the first radio access network.

In Example 24, the subject matter of any one of Examples 17-23 may optionally include the first radio access network being a wireless local area network and the second radio access network being a cellular mobile communication network.

In Example 25, the subject matter of any one of Examples 17-24 may optionally include, if the first communication network has a higher rate than the second communication network, determining the size threshold as low as possible to stay within the limit of the average delay.

In Example 26, the subject matter of any one of Examples 17-25 may optionally include, if the second communication network has a higher rate than the first communication network, determining the size threshold as high as possible to stay within the limit of the average delay.

In Example 27, the subject matter of any one of Examples 17-26 may optionally include the communication terminal being a subscriber terminal of at least one of the first radio access network or the second radio access network.

In Example 28, the subject matter of any one of Examples 17-27 may optionally include determining the size of the data to be communicated by estimating the size of the data based on historical statistical information about data sizes.

In Example 29, the subject matter of any one of Examples 17-28 may optionally include determining the size of the data based on information about the size of the data provided by a source of the data.

In Example 30, the subject matter of any one of Examples 17-29 may optionally include the data to be communicated being data to be transmitted from the communication terminal to a component of the communication network or being data to be received by the communication terminal from a component of the communication network.

In Example 31, the subject matter of any one of Examples 17-30 may optionally include the data to be communicated being the data of a data flow.

In Example 32, the subject matter of any one of Examples 17-31 may optionally include determining the size threshold based on a minimization of the power consumption of the communication of the data.

Example 33 is a computer readable medium having recorded instructions thereon which, when executed by a processor, make the processor perform a method for performing radio communication according to any one of Examples 17 to 32.

Example 34 is a communication terminal comprising a first transceiving means for providing a first communication channel between the communication terminal and a communication network via a first radio access network; a second transceiving means for providing a second communication channel between the communication terminal and the communication network via a second radio access network; a size threshold determining means for determining a size threshold based on a limit for an average delay of data communications; a size determining means for determining a size of data to be communicated between the communication terminal and the communication network; a selecting means for selecting the first transceiving means and the first communication channel or the second transceiving means and the second communication channel for communicating the data based on a comparison of the size of the data with the size threshold and a controlling means for controlling the selected transceiving means to communicate the data via the selected communication channel.

In Example 35, the subject matter of Example 34 may optionally include the size threshold determining means being for determining the size threshold based on statistical information about the data.

In Example 36, the subject matter of Example 35 may optionally include the statistical information including an expected size of the data and a variance of the size of the data.

In Example 37, the subject matter of any one of Examples 34-36 may optionally include the selecting means being for selecting the first communication network if the size is above the size threshold.

In Example 38, the subject matter of any one of Examples 34-37 may optionally include the size threshold determining means being for determining the size threshold based on an expected delay of transmission of data via the first radio access network and an expected delay of transmission of data via the second radio access network.

In Example 39, the subject matter of Example 38 may optionally include the expected delay of transmission of data via the first radio access network and the expected delay of transmission of data via the second radio access network depending on the size threshold.

In Example 40, the subject matter of any one of Examples 34-39 may optionally include the size threshold determining means being for determining the size threshold based on an expected period of unavailability of the first radio access network.

In Example 41, the subject matter of any one of Examples 34-40 may optionally include the first radio access network being a wireless local area network and the second radio access network being a cellular mobile communication network.

In Example 42, the subject matter of any one of Examples 34-41 may optionally include the size threshold determining means for, if the first communication network has a higher rate than the second communication network, determining the size threshold as low as possible to stay within the limit of the average delay.

In Example 43, the subject matter of any one of Examples 34-42 may optionally include the size threshold determining means being for, if the second communication network has a higher rate than the first communication network, determining the size threshold as high as possible to stay within the limit of the average delay.

In Example 44, the subject matter of any one of Examples 34-43 may optionally include the communication terminal being a subscriber terminal of at least one of the first radio access network or a second radio access network.

In Example 45, the subject matter of any one of Examples 34-44 may optionally include the size determining means being for determining the size of the data to be communicated by estimating the size of the data based on historical statistical information about data sizes.

In Example 46, the subject matter of any one of Examples 34-45 may optionally include the size determining means being for determining the size of the data based on information about the size of the data provided by a source of the data.

In Example 47, the subject matter of any one of Examples 34-46 may optionally include the data to be communicated being data to be transmitted from the communication terminal to a component of the communication network or being data to be received by the communication terminal from a component of the communication network.

In Example 48, the subject matter of any one of Examples 34-47 may optionally include the data to be communicated being the data of a data flow.

In Example 49, the subject matter of any one of Examples 34-48 may optionally include the size threshold determining means being for determining the size threshold based on a minimization of the power consumption of the communication of the data.

It should be noted that one or more of the features of any of the examples above may be combined with any one of the other examples.

In the following, examples are described in more detail in context of a scenario as illustrated in FIG. 1 wherein the first radio access network is a cellular communication network and the second radio access network is a WLAN (e.g. a WiFi network).

It is assumed that the mobile terminal 105 has a single user who is generating or requesting flows of different applications running on the mobile terminal 105 (e.g. a smartphone or tablet) and sizes (over time). The offloading according to the following examples is an offloading on flow-level, i.e. all packets belonging to a flow are communicated (sent/received) over the same network interface (i.e. using either the cellular network or the WiFi network). It is assumed that the mobile terminal 105 can use both interfaces, cellular and WiFi, concurrently such that: i) the mobile terminal 105 can choose which network to send/ receive a flow over, and ii) it can transmit/receive different flows in parallel via the different interfaces. It is further assumed in the following examples that cellular connectivity is available for the mobile terminal, i.e. the mobile terminal is within the coverage area of a cellular communication network which it can use. In contrast, it is assumed that the mobile terminal's user enters and leaves zones with WiFi coverage, with a rate that depends on the users' mobility (e.g., pedestrian, vehicular) and the environment (e.g., rural, urban). WiFi availability can thus be modeled as an ON-OFF alternating renewal process, where ON and OFF times are periods with and without WiFi connectivity (i.e. availability), respectively, wherein the duration of these periods corresponds to a generic random variable.

Typically, a WiFi connection provides a better data rate than a cellular network connection, for example due to the proximity to the access point. Thus, sending/receiving flows over the WiFi network allows reducing transmission times. If transmission/reception power is also similar for both the WiFi and cellular interfaces (which is what is typically the case under typical operating conditions), sending flows over WiFi thus also allows reducing power consumption of the mobile terminal (since it takes less time to send the same number of bits). However, a flow (or flow request) arriving at the WiFi queue (i.e. being distributed to the WiFi interface) may experience an extra delay if it arrives during an OFF time. This creates a tradeoff between energy and average per-flow-delay. In other words, a flow may experience an additional queuing delay at a certain interface.

According to the following examples, this is resolved based on the observation that energy is paid per bit (since it is proportional to transmission time), but the extra WiFi delay (due to OFF times) is paid per flow (delay impact being perceived at flow level). Accordingly, assuming that WiFi provides a higher rate than cellular, (e.g. few) large flows are sent to WiFi (i.e. are communicated via the WiFi interface), and small flows to cellular (i.e. are communicated via the cellular interface). This may bring important benefits, especially when flow size distribution has high variance (which is often the case).

In the following, an optimization problem is formulated for minimizing the energy consumption while keeping the average per-flow delay bounded, and a policy for a generic setting (i.e., considering the WiFi availability patterns, flow size distribution, relative rates, and queuing delays) is derived.

Figure 4:
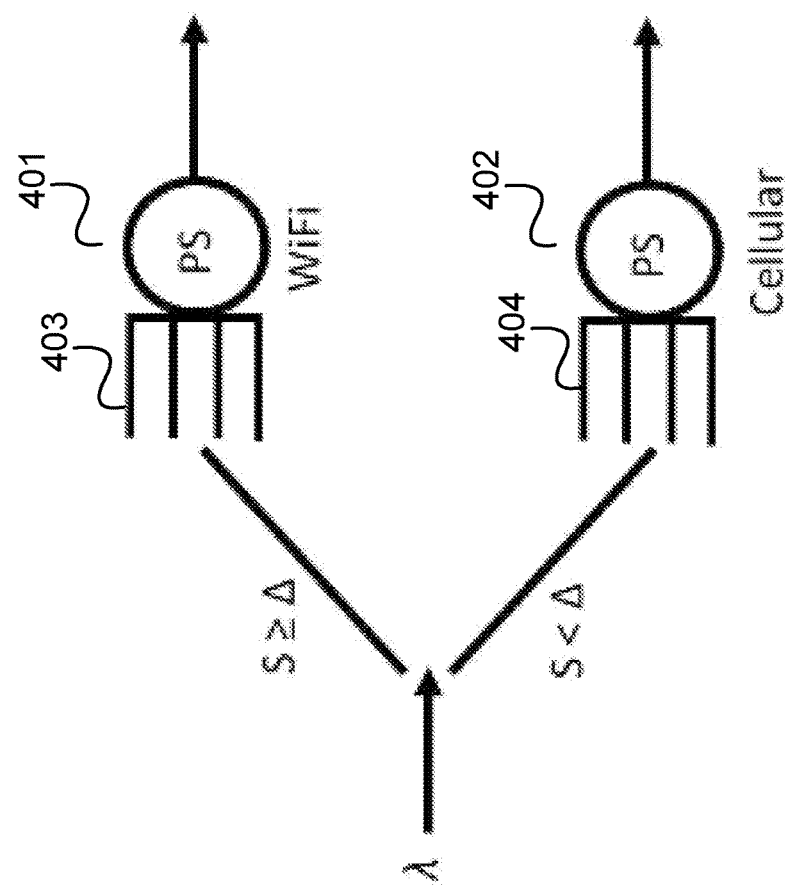
FIG. 4 shows a queuing system model for a mobile terminal.

For this, the mobile terminal is modeled, with respect to its WiFi interface and its cellular interface, as shown in FIG. 4.

FIG. 4 shows a queuing system model for a mobile terminal.

Flows arrive according to a Poisson process with parameter A and are assigned to the two servers 401, 402 representing the WiFi interface and the cellular interface, respectively. The flows may be downlink flows or uplink flows.

Each server 401, 402 has a queue 403, 404 and serves the flows in its queue using processor-Sharing (PS), i.e., the server (either WiFi or cellular) capacity is equally shared among all the flows currently assigned to the server.

For the following, it is assumed that the WiFi interface provides higher data rates than the cellular interface. According to the Threshold Policy (TP) of the current example all flows larger than a certain threshold denoted as $\Delta$ are assigned to the WiFi server 401 and flows smaller than $\Delta$ are assigned to the cellular server 402.

It is assumed that the size of incoming flows, denoted with S, follows a generic probability distribution F(s), s∈[$S_m$, $S_M$], (with density f(s) when F is continuous). An indicator random variable X is defined to be equal to 1 if S≥$\Delta$, and equal to 0 if S<$\Delta$. Thus, the expected value of X is: E[X]=1−F($\Delta$)=p for each flow i. Hence, each new flow is routed to WiFi with probability p and to cellular with 1−p, independently, which maintains the Poisson nature of the input to each queue (Poisson Thinning). Each interface can be seen as an M/G/1/PS queue, where $R^{WF}$ and $R^C$ are the average rates at the WiFi and cellular queue, respectively. To simplify the notation, the WiFi rate is written as $R^{WF}=K \cdot R^C$, where K∈(0,∞) is the rate ratio. The value K can be seen to be a key parameter as the choice of the interface for a flow strongly depends on it.

The following example of a threshold policy can be seen to be based on finding a policy that minimizes energy consumption while keeping the average per-flow delay bounded with a focus on the average transmission/reception power to serve a large number of flows. Depending on the mobile terminal (e.g. mobile phone) technology, CPU frequency, autosleep modes, etc., idle/sleep power consumption may range from being comparable to power consumption when active to much less than the power consumption when active. Nevertheless, the idle/sleep power consumption can be seen to essentially add a constant to the total energy consumption which is often similar for each interface (WiFi/cellular) so this is ignored in the following computation.

It can be seen that among all the flow-assignment policies (not necessarily size-based) for a system as represented in FIG. 4, the size-based policy with threshold $\Delta$ given by the following optimization problem (according to the expressions (1) to (5) below), gives the minimum possible energy consumption subject to an average delay constraint of $D_M$.

$$\min_{\Delta} \frac{P}{R^C} \left[ \frac{E[S \cdot X]}{K} + E[S \cdot (1-X)] \right] \quad (1)$$

$$\text{s.t. } d(\Delta) := \frac{1}{\frac{KR^C}{E[S \cdot X]} - \lambda} + \frac{1}{\frac{R^C}{E[S \cdot (1-X)]} - \lambda} + p \cdot D^{WF} \leq D_M \quad (2)$$

$$\frac{\lambda E[S \cdot X]}{KR^C} < 1 \quad (3)$$

$$\frac{\lambda E[S \cdot (1-X)]}{R^C} < 1 \quad (4)$$

$$S_m \leq \Delta \leq S_M \quad (5)$$

The objective function (1) represents the average transmission (reception) energy in the system.

Basically, it is equal to the power P, multiplied by the time the interfaces are working on the flows (i.e., transmitting/receiving) that is given by sum of the flow sizes divided by the rate.

The first constraint (2) represents the per-flow delay constraint. Specifically, this is given by the mean transmission (reception) time at each queue/interface plus the extra delay experienced, on average, by flows due to WiFi unavailability periods, namely $D^{WF}$.

The constraints (3) and (4) represent the stability conditions for the two interfaces and the constraint (5) limits $\Delta$ to the allowed values.

The optimization problem according to (1) to (5) can be applied to both on-the-spot offloading (when $D^{WF}=0$) and delayed offloading (when $D^{WF}>0$). It can also be applied to both cases where WiFi is faster or cellular is faster (e.g. in LTE-A or femto cell cases).

It can be proven that, under any flow size distribution, the objective function (1) is monotonic in the threshold Δ. Thus, the optimal threshold that minimizes the objective function (1) (i.e. the average transmission/reception energy), namely Δ*, is either Δ*=$S_m$ (for K>1) or Δ*=$S_M$ (for K<1). Moreover, it can be shown that, under any flow size distribution, the delay constraint (2) has a unique minimum in [$S_m$, $S_M$]. Thus, the mobile terminal 105 for example uses the following offloading policy (which can be shown to be optimal):
A) The policy for K>1 is:
If $D_M$>d($S_m$) then Δ*=$S_m$;

$$\text{If } D_M < \min_\Delta \{d(\Delta)\}$$

then the problem is infeasible;
Otherwise, it is the solution of equation d(Δ)=$D_M$. If there are two solutions, then Δ* is the smaller one.
B) The policy for K<1 is:
If $D_M$>d($S_M$) then Δ*=$S_M$;

$$\text{If } D_M < \min_\Delta \{d(\Delta)\}$$

then the problem is infeasible;
Otherwise, it is the solution of equation d(Δ)=$D_M$. If there are two solutions, then Δ* is the larger one.

Here, d($S_m$) stands for the average flow delay for the case where Δ*=$S_m$ and d($S_M$) stands for the average flow delay for the case where Δ*=$S_M$.

Depending on how K behaves, the threshold Δ* may change over time based on current network conditions (i.e., network rates and WiFi network availability).

The frequency at which the terminal re-determines the threshold Δ* (i.e. how the terminal determines Δ* according to A and B above) may for example be set depending on the environment/type of user: for example, in the pedestrian case (low mobility) the interval between two determinations of Δ* can be set of the order of several minutes (e.g. 30 minutes). For a vehicular user (high mobility) this interval is for example set to be shorter (e.g. a few minutes) since network conditions can be expected to change much faster. However, the interval is for example kept above a certain minimum to avoid introducing too much (computational) overhead in the TP which would decrease the policy efficiency. Accordingly, the communication terminal may set the duration of this time interval according to this trade-off between accuracy (i.e. to follow the network condition properly and timely) and overhead.

The mobile terminal 105 may compute the optimal threshold Δ* given the flow size distribution. The mobile terminal 105 may for example estimate statistics (e.g. 1st and 2nd moments) of the flow size distribution. For example, the mobile terminal 105 estimates the mean and the variance of the flow size distribution and fits a given distribution to the estimated mean and variance and this distribution for the calculation of the values of d according to (2) to derive the threshold policy according to A) and B). For example, the mobile terminal uses the Hyper-Exponential (HE) distribution since it is relatively easy to set its parameters to get arbitrary mean and variance. The accuracy of this approximation can be validated with simulations.

It should be noted that also for K<1 the threshold policy assigns large flows to WiFi. Indeed, these flows may incur the delay ($D^{WF}$) which is a major component of the delay and it is thus desirable that as few flows as possible have it. In other words, for K<1 the threshold policy assigns more flows to the cellular network, in fact as many as possible. But, if for load-balancing reasons the threshold policy has to send some flows to WiFi, then the fewer flows are sent there (since $D^{WF}$ is paid per flow).

Further, for computing the optimal threshold Δ* the mobile terminal 105 may periodically determine the rates $R^{WF}$ and $R^C$ and determine the parameter K based on these rates.

In the following, a comparison of the threshold policy as described above with other possible policies is given. Specifically, the following policies are considered:
1) Cell-only: all flows are sent over the cellular interface (i.e., a typical default in current devices);
2) WiFi-only: all flows are sent over the WiFi interface (i.e., a typical default in current devices, if there is always WiFi connectivity);
3) FB: the number of flows are balanced per interface, thus exploiting the parallel availability of the interfaces;
4) LB: the load is balanced between the two interfaces, thus improving the queuing delay.

Figure 5:
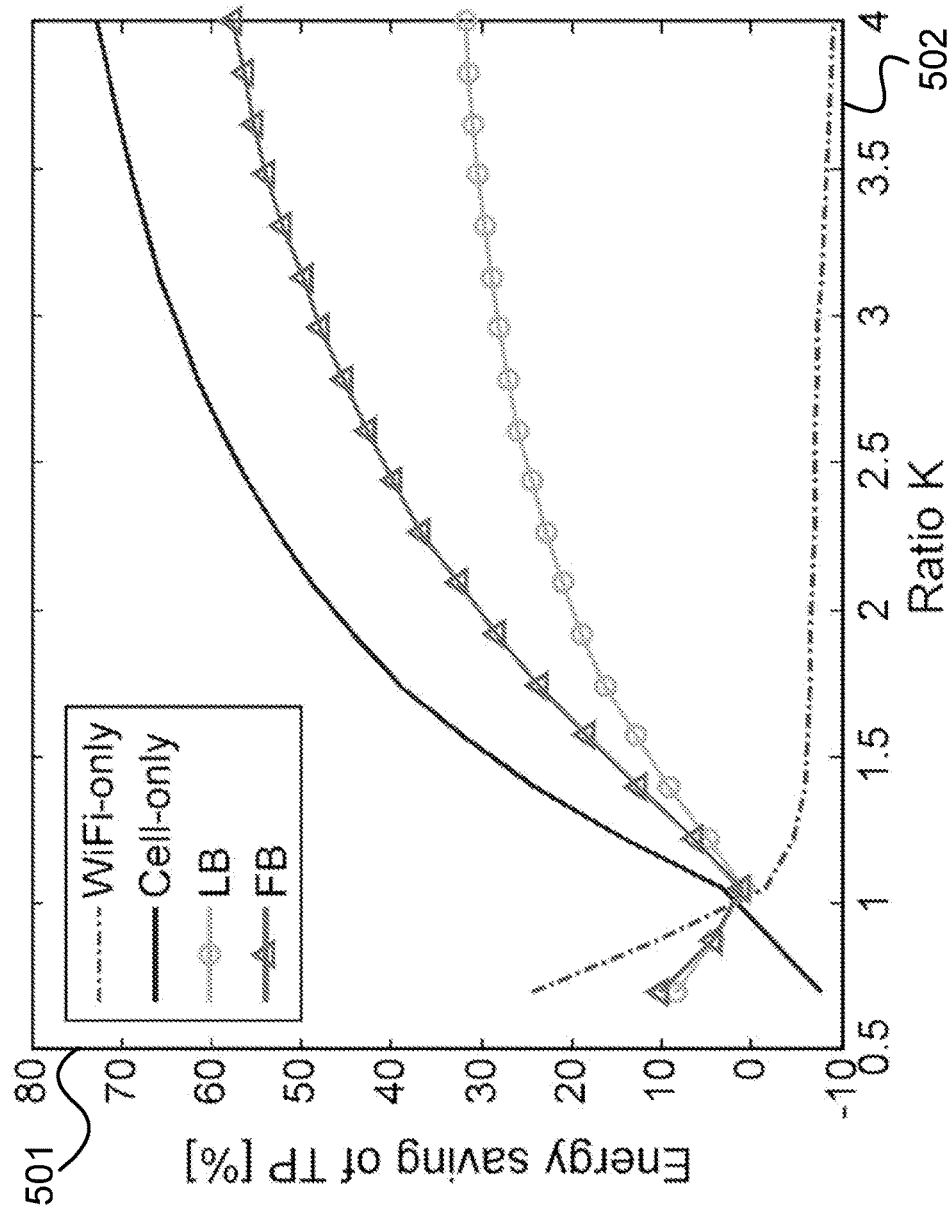
FIG. 5 shows a comparison of relative energy savings for different offloading policies.

FIG. 5 shows relative energy savings of the threshold policy compared to the other policies for a realistic scenario (urban environment, pedestrian user).

The energy saving of the threshold policy is given in percent in accordance with the vertical axis 501. The value of K increases from left to right in accordance with the horizontal axis 502.

It can be observed that the threshold policy outperforms the other policies in terms of energy except for the WiFi-only policy, as expected (as the latter is the optimal unconstrained policy for K>1). However, the WiFi-only policy, as well as the rest of the policies violate the delay constraint, sometimes significantly as shown in FIG. 6.

Figure 6:
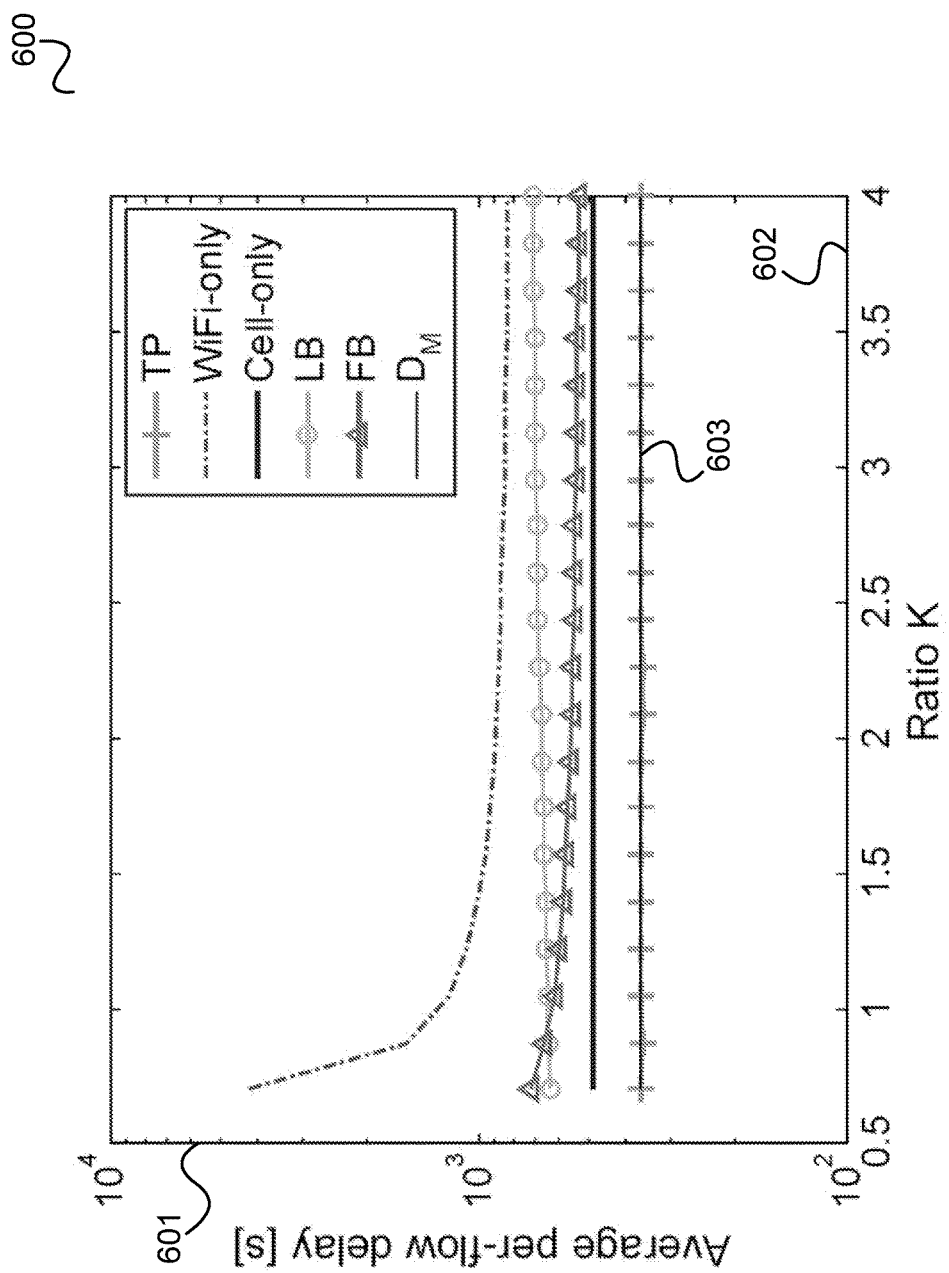
FIG. 6 shows a comparison of the average delay for different offloading policies.

FIG. 6 shows the average delay of the above policies and the threshold policy. The average per-flow delay increases in logarithmic scale from bottom to top in accordance with the vertical axis 601. The value of K increases from left to right in accordance with the horizontal axis 602. An example for a delay limit DM is given by a solid line 603.

It can be seen that the FB policy and the LB policy outperform the Cell-only policy and the WiFi-only policy in terms of energy-delay trade-off. This is reasonable as these two policies can be seen to already try to do something smarter by balancing the amount of traffic between the two interfaces. However, as can be proven also analytically, the threshold policy achieves the minimum energy consumption among all the policies that do not violate the per-flow delay constraint, by also taking into account WiFi unavailability statistics and flow size variability. In fact, the higher the flow size variability the more threshold policy outperforms the other policies.

In summary, the simulation results as illustrated in FIGS. 5 and 6 show that:
1) for K>1, WiFi-based offloading according to the threshold policy alleviates the cellular load (utilization), dropping utilization from 0.6 to less than 0.1 (more than a 6× improvement);
2) energy consumption compared to the Cell-only policy is very low (e.g. 70% of energy saved for K=4), and always lower than other load balancing policies;
3) the above savings can be achieved by offloading only a small subset of (large) flows (between 10% and 40%) to WiFi, and even fewer of them will actually experience an extra delay due to WiFi unavailability; this percentage becomes even smaller when the flow size variability increases.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
   a first transceiver configured to provide a first communication channel between the communication terminal and a communication network via a first radio access network;
   a second transceiver configured to provide a second communication channel between the communication terminal and the communication network via a second radio access network;
   a size threshold determiner configured to determine a size threshold based on statistical information about the data; wherein the statistical information includes an expected size of the data and a variance of the size of the data;
   a size determiner configured to determine a size of data to be communicated between the communication terminal and the communication network;
   a selector configured to select the first transceiver and the first communication channel or the second transceiver and the second communication channel for communicating the data based on a comparison of the size of the data with the size threshold; and
   a controller configured to control the selected transceiver to communicate the data via the selected communication channel.

2. The communication terminal of claim 1, wherein the selector is configured to select the first communication network if the size is above the size threshold.

3. The communication terminal of claim 1, wherein the size threshold determiner is configured to determine the size threshold based on an expected delay of transmission of the data via the first radio access network and an expected delay of transmission of the data via the second radio access network.

4. The communication terminal of claim 3, wherein the expected delay of transmission of the data via the first radio access network and the expected delay of transmission of the data via the second radio access network depends on the size threshold.

5. The communication terminal of claim 1, wherein the size threshold determiner is configured to determine the size threshold based on an expected period of unavailability of the first radio access network.

6. The communication terminal of claim 1, wherein the first radio access network is a wireless local area network and the second radio access network is a cellular mobile communication network.

7. The communication terminal of claim 1, wherein the size threshold determiner is configured, if the first communication network has a higher rate than the second communication network, to determine the size threshold as low as possible to stay within the limit for an average delay.

8. The communication terminal of claim 1, wherein the size threshold determiner is configured, if the second communication network has a higher rate than the first communication network, to determine the size threshold as high as possible to stay within the limit for an average delay.

9. The communication terminal of claim 1, wherein the communication terminal is a subscriber terminal of at least one of the first radio access network or a second radio access network.

10. The communication terminal of claim 1, wherein the size determiner is configured to determine the size of the data to be communicated by estimating the size of the data based on historical statistical information about data sizes.

11. The communication terminal of claim 1, wherein the size determiner is configured to determine the size of the data based on information about the size of the data provided by a source of the data.

12. The communication terminal of claim 1, wherein the data to be communicated is data to be transmitted from the communication terminal to a component of the communication network or is data to be received by the communication terminal from a component of the communication network.

13. The communication terminal of claim 1, wherein the data to be communicated is the data of a data flow.

14. The communication terminal of claim 1, wherein the size threshold determiner is configured to determine the size threshold based on a minimization of the power consumption of the communication of the data.

15. A method for communicating data comprising:
   determining a size threshold based on statistical information about the data wherein the statistical information includes an expected size of the data and a variance of the size of the data;
   determining a size of data to be communicated between a communication terminal and a communication network;
   selecting a first communication channel between the communication terminal and a communication network via a first radio access network or a second communication channel between the communication terminal and the communication network via a second radio access network for communicating the data based on a comparison of the size of the data with the size threshold; and
   communicating the data via the selected communication channel.

16. A computer readable medium having recorded instructions thereon which, when executed by a processor, make the processor perform a method for performing radio communication according to claim 15.

* * * * *